United States Patent [19]

South, Jr.

[11] 4,444,921

[45] Apr. 24, 1984

[54] COATED CALCIUM CARBONATE IN POLYESTER/RUBBER MOLDING COMPOUND

[75] Inventor: Aubrey South, Jr., Bartlesville, Okla.

[73] Assignee: Phillips Petroleum Company, Bartlesville, Okla.

[21] Appl. No.: 423,384

[22] Filed: Sep. 24, 1982

[51] Int. Cl.³ .............................................. C08K 3/26
[52] U.S. Cl. ................... 523/200; 523/514; 523/522; 523/523; 523/526
[58] Field of Search .............. 523/200, 522, 523, 526, 523/514

[56] References Cited

U.S. PATENT DOCUMENTS

| | | | |
|---|---|---|---|
| 2,841,504 | 7/1958 | Liggett | 523/200 |
| 3,564,077 | 2/1971 | Brinkmann et al. | 525/123 |
| 3,576,911 | 4/1971 | Maxey | 525/93 |
| 3,766,129 | 10/1973 | Pesez | 523/514 |
| 3,806,490 | 4/1974 | Kajiura et al. | 523/523 |
| 3,925,272 | 12/1975 | Ibata et al. | 523/522 |
| 3,989,769 | 11/1976 | Bennington | 523/526 |
| 3,998,909 | 12/1976 | Roberts et al. | 523/527 |
| 4,020,036 | 4/1977 | South, Jr. | 523/514 |
| 4,158,654 | 6/1979 | Moczygemba et al. | 523/511 |
| 4,386,169 | 5/1983 | Artur et al. | 523/200 |

FOREIGN PATENT DOCUMENTS

| | | | |
|---|---|---|---|
| 2507125 | 9/1975 | Fed. Rep. of Germany . | |
| 2262079 | 2/1975 | France . | |
| 53-64256 | 6/1978 | Japan | 523/200 |
| 1276198 | 6/1972 | United Kingdom . | |

*Primary Examiner*—Lewis T. Jacobs

[57] ABSTRACT

A thermosettable composition suitable for preparing reinforced plastic articles is prepared by combining an unsaturated polyester, a rubber, a vinyl monomer, a catalyst and a calcium carbonate filler coated with a fatty acid or fatty acid metal salt. The resulting compositions when cured exhibits high impact strength.

25 Claims, No Drawings

COATED CALCIUM CARBONATE IN POLYESTER/RUBBER MOLDING COMPOUND

BACKGROUND OF THE INVENTION

This invention relates to unsaturated polyester compositions containing a rubber and a calcium carbonate filler.

Molding compositions, particularly polyester thermosetting molding compositions are finding wider application in such areas as automotives, appliances, toys, and other molded items. Their acceptance depends, in part, upon the degree of impact strength the cured molded article possesses. The art teaches that unsaturated polyester compositions have increased impact strength imparted thereto through the use of a rubbery polymer. U.S. Pat. Nos. 4,158,654 and 4,020,036 describe thermosetting compositions comprised of an unsaturated polyester resin, fillers, such as calcium carbonate, additives and a carboxy-containing diene polymer, the carboxy content being shown to further increase the impact strength of the final cured molded composition.

However, there is a need in the industry for even greater impact strength particularly as the emphasis moves from toys and other light duty applications to structural components such as automobile fenders and other load bearing structures in automobiles and appliances. Also these compositions tend to give areas of low gloss in the final molded product which is not like surface problems in other areas of plastic molding, and the cause of which is not understood.

SUMMARY OF THE INVENTION

It is an object of this invention to increase the impact resistance of cured rubber-modified polyester resin-based thermosetting molding compositions;

It is a further object of this invention to improve surface appearance of cured rubber-modified polyester resin-based thermosetting molded articles; and It is a further object of this invention to provide a molded article having improved impact strength.

In accordance with this invention there is provided a composition comprising an unsaturated polyester and a normally solid rubber, a vinyl monomer and a calcium carbonate filler, said calcium carbonate being coated with a fatty acid or fatty acid salt.

DESCRIPTION OF THE PREFERRED EMBODIMENTS

The unsaturated polyesters useful in this invention are prepared by reacting an unsaturated dicarboxylic acid having 4 to 12 carbon atoms such as maleic, fumaric, itaconic, citraconic, mesaconic, cis-2-dodecenedioc acid (or anhydrides or acid halides thereof), and mixtures thereof with one or more polyols. Representative polyols that can be used include alkylene glycols having 2-10 carbon atoms, dialkylene glycols having 4-18 carbon atoms, glycerol, pentaerythritol, trimethylolpropane, trimethylpentanediol, trimethylpropanediol and hydrogenated Bisphenol-A.

Up to one-half or more on a molar ratio of the unsaturated acid can be replaced by one or more saturated polycarboxylic acids having from 2-12 carbon atoms to modify the degree of unsaturation and reactivity of the polyester. Illustrative of these are oxalic acid, malonic acid, succinic acid, methylsuccinic acid, glutaric acid, adipic acid, suberic acid, sebacic acid, the phthalic acids, naphthalene dicarboxylic acid, cyclohexane dicarboxylic acid, citric acid, and the like and mixtures thereof.

The proportion of polyhydric alcohols having more than two hydroxy groups such as glycerol, pentaerythritol, etc. and the proportion of polycarboxylic acids having more than two carboxy groups such as citric acid is preferably less than about 5 mole percent each based on total amount of polyol and polycarboxylic acid respectively so that a polyester is obtained with maximum esterification of the hydroxy and carboxy groups without being so viscous that difficulty would be experienced during subsequent compounding.

The normally solid rubbers of this invention are known materials. Suitable rubbers include natural and synthetic rubbers broadly.

The diene addition in the synthetic polymers of conjugated dienes can be in the 1, 2 mode or the 1, 4 mode or combinations thereof. The unsaturation microstructure of the polymers is generally in the range of from about 5 to 76 percent vinyl, from about 5 to 60 percent trans and from about 15 to 50 percent cis unsaturation.

The synthetic diene polymers of this invention include the homopolymers and copolymers of the conjugated dienes. Preferred copolymers are copolymers of the conjugated dienes and a monovinyl-substituted aromatic hydrocarbon containing from about 8-18 carbon atoms per molecule. The monovinyl-substituted aromatic hydrocarbon can contain alkyl, cycloalkyl, and aryl substituents, and combinations thereof such as alkylaryl in which the total number of carbon atoms in the combined substitutents is generally not greater than 12. Examples of the monovinyl-substituted aromatic monomer include: styrene, 3-methylstyrene, 4-n-propylstyrene, 4-cyclohexylstyrene, 4-dodecylstyrene, 2-ethyl-4-benzylstyrene, 4-(4-phenyl-n-butyl)styrene, 1-vinylnaphthalene, 2-vinylnaphthalene, 4-t-butylstyrene and the like. Styrene is presently preferred because of its availability and effectiveness. The polymerized conjugated diene content of these copolymers ranges from about 55 to 100 weight percent, i.e., sufficient diene to give a rubbery or elastomeric as opposed to a resinous polymer.

Although the presently preferred conjugated diene is 1,3-butadiene, it is within the scope of the polymers of this invention to use conjugated dienes containing from 4-12 carbon atoms per molecule, more preferably from 4-8 carbon atoms per molecule. Examples of such compounds include 1,3-butadiene, isoprene, 2,3-dimethyl-1,3-butadiene, piperylene, 3-butyl-1,3-octadiene, 1-phenyl-1,3-butadiene, and the like and mixtures thereof.

The conjugated diene-monovinyl-substituted aromatic hydrocarbon copolymers can be of random or block configuration or combinations thereof. Block polymers are presently preferred. Either AB, ABA or radial (or otherwise branched) block polymers are suitable, the B being the polymerized diene component.

The polymers of conjugated dienes of this invention can be prepared according to previously cited patents and by free radical polymerization in solution, suspension or emulsion processes. For example, polymerization can be initiated with carboxy-containing compounds such as azo-bis-cyano-pentanoic acid, di($\beta$-carboxypropionyl) peroxide (succinic acid peroxide) and the like. Chain transfer agents such as thioglycolic acid and the like are used to regulate the molecular weight of the polymer produced in such processes. It is preferred to prepare the polymers in a hydrocarbon solution using an organolithium initiator such as n-butyllithium.

It is within the scope of preparing the carboxy-containing polymers of conjugated dienes to react polymers such as hydroxy terminated polymers with an anhydride of an unsaturated dicarboxylic acid such as maleic anhydride, citraconic anhydride, itaconic anhydride, chloromaleic anhydride, 3- and 4-methyl hexahydrophthalic anhydride, and the like to produce polymers with attached groups terminated with a carboxy group. Other carboxy-containing diene polymers can be prepared in emulsion systems incorporating reactive unsaturated carboxylic acid monomers.

The simplest and presently preferred method of making the carboxy-terminated polymer is to utilize carbon dioxide as a terminating agent of organolithium initiated polymer chains. As a nonlimiting sample, a 70/30 block butadiene-styrene copolymer can be made in 85 percent cyclohexane with butyllithium initiator by first completely polymerizing styrene followed by the addition of, and complete polymerization of butadiene, both being carried out in a 70° C. bath. The resulting active polymer solution is then mixed with excess carbon dioxide in a mixing tee, preferably under substantially anhydrous conditions, acidified, and antioxidant added. The polymer is then recovered by alcohol coagulation and and dried in a vacuum oven. Alternatively, the carbon dioxide can simply be bubbled through the solution, preferably under substantially anhydrous conditions, at about 100° F. and the polymer recovered by steam stripping and extruder drying. If desired, a randomizer such as tetrahydrofuran can be utilized. For instance, 10–30 parts of randomizer per hundred parts by weight of monomers as a vinylizer to make a high 1,2-addition of the butadiene with the solution being cooled to just below 70° F. prior to addition of the butadiene to aid in obtaining high 1,2-addition with the polymerization itself being adiabatic.

Also diene polymers can be modified with peroxide and unsaturated reactive carboxylic acids or thio-containing carboxylic acids to give carboxy-containing polymers.

Carboxy-terminated normally solid polymers of conjugated dienes are described in U.S. Pat. Nos. 3,135,716 (Uraneck et al, June 1964) and 3,242,129 (Wilder, March 1966), the disclosures of which are hereby incorporated by reference. These polymers generally have a carboxyl content in the range of about 0.01 to 5 weight percent.

The polymers of conjugated dienes for use in this invention are normally solid and generally have a weight average molecular weight of 30,000 to 400,000 or higher, preferably 50,000 to 250,000. In terms of inherent viscosity, the ranges encompassed are from about 0.4 to 3, more preferably from about 0.6 to 2. Inherent viscosity is determined using 0.1 gram per 100 mL of toluene at 25° C.

The weight ratio of unsaturated polyester to rubber such as carboxy-containing polymer of a conjugated diene generally ranges from about 15:1 to 0.5:1, preferably from about 5:1 to 1:1.

Representative vinyl monomers include styrene, vinyltoluene, divinylbenzene, 2-vinylpyridine, diallyl phthalate, triallyl isocyanurate, α-methylstyrene, alkyl acrylates and alkyl methacrylates in which the carbon atoms in the alkyl groups range from 1 to about 6 and the like and mixtures thereof. The presently preferred vinyl monomer is styrene because of its availability, reactivity, cost and desirable properties. Total vinyl monomer from all sources is 15 to 300, preferably 30 to 200 parts by weight vinyl monomer per 100 parts by weight polyester plus rubber. This vinyl monomer is mixed in the final formulation with the already produced unsaturated polyester and the already produced rubber. It may be desirable in some instances to use a solution of the already produced rubber in the vinyl monomer to combine with the other ingredients, hence, the notation as to the amount of vinyl monomer or being that from all sources, i.e., that used, if any, to dissolve the rubber and the additional, if any, added on mixing with the polyester.

The catalysts used in this invention are conventional free radical polymerization initiators selected from among organic peroxides and hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate and the like. In addition, azo compounds such as azobis-isobutyronitrile can be employed. A presently preferred catalyst is t-butyl perbenzoate. The catalyst is generally used in the range from about 0.1 to 10 parts by weight per 100 parts by weight polyester plus carboxy-containing polymer of a conjugated diene, more preferably from about 0.5–5 parts by weight catalyst.

The fatty acid or fatty acid metal salt-coated calcium carbonate useful in this invention are those calcium carbonates coated with materials represented by the formula

wherein R can be any alkyl or alkenyl radical having from 9 to 25 carbon atoms, M can be hydrogen or any metal in Group IA, IIA, or IIB of the Periodic Table; and n is the valence of M. Exemplary of such materials are, for example, Saturated Fatty Acids:
  Capric Acid
  Lauric Acid
  Myristic Acid
  Palmitic Acid
  Stearic Acid
  Arachidic Acid
  Behenic Acid
  Lignoceric Acid
  Cerotic Acid
Unsaturated Fatty Acids:
  Δ9,10-Decylenic Acid
  Palmitoleic Acid
  Oleic Acid
  Ricinoleic Acid
  Linoleic Acid
  Linolenic Acid
  Tariric Acid
  Arachidonic Acid
  Erucic Acid
  Selacholeic Acid and the like and mixtures thereof. In addition, metal salts of the above class of fatty acids are also exemplary materials useful in this invention. Such metals are, for example, lithium, sodium, potassium, rubidium, cesium, magnesium, calcium, strontium, barium, zinc and cadmium.

Calcium carbonate can be coated with the above fatty acids or their metal salts in any suitable manner known to those skilled in the art. One such method is to mill or grind the coating material into the calcium carbonate. Another method is to dissolve or disperse the coating material in a suitable solvent, mix with the calcium carbonate and evaporate the solvent.

The use of the grinding or solvent can result in the fatty acid or fatty acid salt being chemically bonded to the surface of the calcium carbonate. In any event, the coating and calcium carbonate are not a simple physical mixture but rather the coating is intimately adhered to the surface of the calcium carbonate.

The quantity of coated calcium carbonate filler to be used is generally in the range of from about 25 to 800 parts by weight per 100 parts by weight of polyester plus rubber, more preferably from about 100 to 400 parts by weight.

Blends of coated and uncoated calcium carbonate can also be used. In such blends from 1–90 percent can be uncoated (i.e., at least 10 percent coated) and from 10–99 percent can be coated although preferably the blends have 15–60 percent coated component. Where blends are used the above recited concentrations apply to the total calcium carbonate not just the coated component.

The coating is generally applied in an amount so as to give 0.1 to 10 perferably 0.5 to 2 weight percent based on the weight of the calcium carbonate being coated.

Additional fillers can be used such as calcium silicate, talc, clay, alumina, aluminum hydroxide, antimony trioxide, silica, mica, barium sulfate, calcium sulfate and the like and mixtures thereof.

The reinforcing agents used in this invention comprise fibers selected from among glass, asbestos, carbon, graphite, metal, synthetic polymers such as polyamides, polyesters, polyolefins and the like and natural fibers such as cotton, jute, hemp, sisal, flax, wood, paper and the like. A presently preferred fiber is glass. The fibers can be used in the form of mats, fabrics, threads, chopped fiber and the like. The quantity of reinforcing agent used is generally in the range from about 20 to 300 parts by weight per 100 parts by weight polyester plus rubber, more preferably from about 40 to 200 parts by weight reinforcing agent.

Lubricants, stabilizers, colorants, thickeners and pigments can be added to the composition as desired.

Desirably, from about 0.2 to 20 parts by weight, preferably from about 1 to 10 parts by weight per 100 parts by weight of polyester plus rubber of an oxide or hydroxide of a Group II metal are added to the compositions of this invention. Exemplary of such compounds are the oxides and hydroxides of magnesium, calcium, strontium, barium and zinc. The compounds provide a thickening function.

A lubricant such as aluminum, barium, calcium, magnesium or zinc stearate and the like in the range of from about 0.2 to 20 parts by weight, more preferably from about 1 to 15 parts by weight per 100 parts by weight of polyester plus rubber can be used to impart mold release properties to the compositions.

A stabilizer such as a barium or cadmium soap, a tin compound such as tin octanoate, a phosphite such as dimethyl phosphite, tris(nonylphenyl)phosphite, alkyl phenols such as BHT, quinones, amines, and the like can be employed in an amount ranging from about 0.02 to 5 parts by weight per 100 parts by weight polyester plus rubber.

Conventional colorants and pigments such as $TiO_2$, carbon black, phthalocyanine pigments and the like, and mixtures thereof, are employed as desired in amounts sufficient to give the desired color to the final molded product. The compositions of this invention possess outstanding pigmentability and smoothness.

The ingredients are incorporated by a milling technique which involves moderate shear. This can be accomplished by means of twin-rotor mixers designed to give moderate shear to the paste-like ingredients. It is essential to provide some shear and because of the viscosity of the materials being mixed, proper mixing cannot be obtained simply by hand stirring. On the other hand, high intensity mixing which would generate excessive heat and activate the catalyst must be avoided also. Sheet molding compounding line mixing equipment can also be used. This mixing under sufficient shear to achieve good dispersion of the ingredients without heat buildup sufficient to activate the catalyst insures a good blend and is necessitated by the fact that the polymer of the conjugated diene is a normally solid material as opposed to a liquid or semi-solid. Shear which gives a heat buildup of 1–50, preferably 2°–30° C. is satisfactory.

The curing can be done at a temperature known in the art for the particular catalyst utilized. Generally a temperature of 100° C. to 200° C. and a time of 1 to 15 minutes in a press is sufficient. The following examples serve to illustrate the operability of this invention.

EXAMPLE I

This example describes a typical procedure used to prepare and test the rubber-modified polyester resin-based molding compounds disclosed herein. Into a one-quart Baker-Perkins sigma mixer was placed 230 grams of calcium carbonate filler and 151 grams of a solution comprised of 45.3 grams (30 weight percent) of a carboxy-terminated 70 parts by weight butadiene/30 parts by weight styrene linear block copolymer ($M_w=162,000$, $M_n=116,000$, 50 weight percent trans unsaturation and 11 weight percent vinyl unsaturation), and 105.7 grams liquid styrene. This mixture was mixed for 5 minutes whereupon another 460 grams of calcium carbonate filler was added and the mixing continued for 5 minutes. A mixture comprised of 138 grams of unsaturated polyester dissolved in styrene (62 weight percent of a propylene glycol/maleic anhydride copolymer, Koppers 3702-5), 4.4 grams of magnesium hydroxide thickener (Marinco H. from Merck and Co., Inc.), 8.1 grams of zinc stearate mold release agent (Synpro ABG from Synthetic Products) and 2.3 grams of t-butyl perbenzoate catalyst which had been premixed was added to the Baker-Perkins mixer and mixed for 5 minutes. The chopped fiber glass reinforcing agent (162 grams of ¼ inch glass fibers, CS-308 from Johns-Manville) was added in two increments to the mixture and mixing was continued for an additional 10 minutes. Plaques, measuring 6 inches×6 inches×0.15 inches (15.2×15.2×0.38 cm), were compression molded from each composition for 5 minutes at 300° F. (149° C.) and 7,000 psig (48.8 MPa gauge). Each plaque was then evaluated to determine its reverse impact strength.

Reverse impact strength in inches, was determined by dropping a 0.6 pound (277 gram) dart with a rounded tip on the flat surface of a plaque clamped in a 5 inch (12.7 cm) diameter ring. Failure is indicated in inches at which a crack or cracks appear on the reverse side of the plaque.

EXAMPLE II

Employing the procedure employed in Example I various calcium carbonates were evaluated. The data listed in Table I shows that calcium carbonate coated with a metal salt of a fatty acid or a fatty acid increases the reverse impact strength of a rubber-modified polyester resin-based molding compound. Also the surface was unexpectedly free of low gloss areas in the invention plaques. The data also shows the improvement brought about by the fatty acid coated calcium carbonate filler is effective only when the polyester composition contains a carboxy containing rubbery diene polymer as the modifier. When the modifier is other than the rubber, for example, a polyvinyl acetate polymer, the coated calcium carbonate filler appears to be ineffective.

TABLE I

Effect of Fatty Acid-Coated $CaCO_3$ on the Reverse Impact Strength of Rubber-Modified Polyester Resin-Based Molding Compounds

| | Weight Percent | Ingredient |
|---|---|---|
| Formulation | 11.96 | Unsaturated Polyester[a] |
| | 13.07 | Modifier[b] |
| | 59.83 | $CaCO_3$ |
| | 14.04 | Chopped Glass Fibers |
| | 0.20 | t-Butyl Perbenzoate |
| | 0.38 | $Mg(OH)_2$ |
| | 0.70 | Zinc Stearate |

| Run No. | Calcium Carbonate Trade Name | Particle Size, μ | Coating | Modifier[b] | Reverse Impact Strength, cm (in.) |
|---|---|---|---|---|---|
| Control Runs: | | | | | |
| 1 | Microwhite 25[c] | 3.2 | none | Rubber | 12.7 (5) |
| 2 | Gamma Sperse 6451[d] | 6 | none | Rubber | 12.7 (5) |
| 3 | Microflo 165[c] | 7 | none | Rubber | 20.3 (8) |
| 4 | Vistron 31-6[e] | 8.3 | none | Rubber | 17.8 (7) |
| 5 | Gamma Sperse 140[d] | 9.5 | none | Rubber | 15.2 (6) |
| 6 | Gamma Sperse 6451[d] | 6 | none | PVA | 10.2 (4) |
| 7 | Hi-Pflex 100[e] | 2 | $C_{16}$—$C_{18}$ Fatty Acid | PVA | 8.9 (3.5) |
| Inventive Runs: | | | | | |
| 8 | CS-11[d] (Gamma Sperse) | 3 | Calcium Stearate | Rubber | 25.4–17.9 (10–11) |
| 9 | Hi-Pflex 100[e] | 3 | $C_{16}$—$C_{18}$[f] Fatty Acid | Rubber | 27.9 (11) |

[a]Unsaturated polyester resin, Koppers 3702-5, 62 weight percent of a propylene glycol/maleic anhydride copolymer dissolved in styrene.
[b]Rubbers = 30 weight percent solution of a carboxy-terminated linear block 70/30 butadiene/styrene copolymer available from Phillips Petroleum Co. dissolved in styrene. The rubber is a mixture of polymers consisting of about 64 weight percent styrene/butadiene block polymer of a weight average molecular weight of about 100,000 containing the $CO_2H$ end groups; about 30 weight percent styrene-butadiene-X-butadiene-styrene linear block copolymer of about 200,000 weight average molecular weight where X is a coupling agent, the coupled polymer being produced as the carboxy-terminated polymer is formed; and about 6 weight percent polystyrene of about 6,000 weight average molecular weight ($CO_2H$ terminated). The butadiene styrene ratio for the total polymer is PVA = 40 weight percent of a polyvinyl acetate polymer (LP-40A, available from Union Carbide) dissolved in styrene.
[c]Available from Sylacauga Calcium Products.
[d]Available from Georgia Marble Co.
[e]Available from Pfizer Minerals.
[f]Identified by NMR and IR as a mixture of 40 weight percent $C_{16}$ fatty acid and 60 weight percent $C_{18}$ fatty acid.

EXAMPLE III

This example demonstrates that the beneficial effect of the coated calcium carbonate extends to formulations made with rubbers broadly and is not limited to carboxy terminated rubber. The rubber used in this example, both the control and the invention runs was a 52/48 butadiene/styrene block copolymer which was not carboxy terminated. A Cowles dissolver which is a device with a high speed mixing blade was used to form the initial paste which was then combined with the glass fibers using an SMC machine. The results were as follows:

Control

Three kilograms of an unsaturated polyester dissolved in styrene (62 weight percent of propylene glycol/maleic and hydride copolymer (Koppers 3702-5) was introduced into a Cowles dissolver. Also added were 3 kilograms of a 30 percent solution of rubber (a 52/48 butadiene/styrene block copolymer) dissolved in styrene, 180 grams of zinc stearate, 15 grams of a black pigment dispersion, 60 grams of tertiary butyl perbenzoate, 15 grams of a cure promoter sold under the tradename PEP-100, 42 grams of magnesium oxide thickener sold under the tradename Maglite A, and 9 kilograms of uncoated calcium carbonate solid under the tradename Camel-Wite. The ingredients were mixed as follows: the polyester and rubber solution were mixed 25 seconds and then the zinc stearate, black dispersion, peroxide and cure promoter were added and mixed to 1 minute. The calcium carbonate was then added followed by the thickener and the resulting mixture was mixed to approximately 40° C. final mixed temperature. The mixture was then transferred to an SMC machine. A compound with 22.7 weight percent chopped glass was obtained. Plaques were molded which plaques had heavy grainyness, pits, and white patches. After several days, the plaques exhibited many small blisters.

Invention

An identical run was made except in place of the 9 kilograms of uncoated calcium carbonate, a mixture of 1800 grams of calcium carbonate coated with calcium stearate sold under the tradename CS-11 and 7200 grams of the uncoated Camel-Wite calcium carbonate were used. The resulting plaques molded from this material also had heavy grainyness but exhibited no pits and no blisters, thus indicating a substantial significant advantage for the invention.

While this invention has been described in detail for the purpose of illustration it is not to be construed as limited thereby but is intended to cover all changes and modifications within the spirit and scope thereof.

I claim:

1. A composition comprising
   (a) an unsaturated polyester prepared by reacting an unsaturated dicarboxylic acid and a polyol;
   (b) a rubber, said rubber being present in an amount so as to give a weight ratio of (a) to (b) within the range of 15:1 to 0.5:1;
   (c) a vinyl monomer, the total amount of vinyl monomer being within the range of 15 to 300 parts by weight of vinyl monomer per 100 parts by weight of said polyester plus said rubber;
   (d) a catalyst; and
   (e) 25 to 800 parts by weight per 100 parts by weight of said polyester plus rubber of calcium carbonate, at least 10 percent of which is coated with 0.1 to 5 weight percent of a fatty acid or fatty acid salt based on the weight of said calcium carbonate.

2. A composition according to claim 1 wherein said rubber is a normally solid carboxy-containing polymer of a conjugated diene having a weight average molecular weight within the range of 50,000 to 250,000 and an inherent viscosity within the range of 0.6 to 2.

3. A composition according to claim 1 wherein said rubber is a copolymer of butadiene and styrene.

4. A composition according to claim 1 wherein said polyester is prepared by reacting fumaric acid and propylene glycol.

5. A composition according to claim 1 wherein said vinyl monomer is styrene.

6. A composition according to claim 1 wherein said ratio of (a) to (b) is within the range of 5:1 to 1:1 and wherein said vinyl monomer is present in an amount within the range of 30 to 200 parts by weight per 100 parts by weight of (a) plus (b).

7. A composition according to claim 1 wherein said catalyst is a peroxide.

8. A composition according to claim 1 wherein said composition contains in addition a reinforcing agent.

9. A composition according to claim 8 wherein said reinforcing agent is glass fibers.

10. A composition according to claim 1 wherein said rubber is a carboxy-containing polymer of a conjugated diene having 55 to 100 percent polymerized conjugated diene units.

11. A composition according to claim 1 wherein said calcium carbonate is a blend of 15-60 percent coated and 85-40 percent uncoated.

12. A composition according to claim 1 wherein all of said calcium carbonate is coated.

13. A composition according to claim 1 wherein said calcium carbonate is coated with a mixture of $C_{16}$ and $C_{18}$ fatty acids or with calcium stearate.

14. A composition according to claim 13 wherein said fatty acid mixture or calcium stearate is coated onto said calcium carbonate by milling.

15. A composition according to claim 14 wherein said unsaturated polyester is produced by reacting fumaric acid and propylene glycol, said rubber is a normally solid carboxy-containing copolymer of butadiene and styrene characterized by a vinyl addition of 5 to 76 percent and having 0.01 to 5 weight percent carboxyl content, said ratio of (a) to (b) being within the range of 5:1 to 1:1, said vinyl monomer is styrene and is present in an amount within the range of 30 to 200 parts by weight per 100 parts by weight of (a) plus (b), said catalyst is tertiary butyl perbenzoate present in an amount within the range of 1 to 5 parts by weight per 100 parts by weight of (a) plus (b), wherein said coated calcium carbonate filler is present in an amount within the range of 100 to 400 parts by weight per 100 parts by weight of (a) plus (b), the coating being present in an amount within the range of 0.25 to 2 weight percent based on the weight of said calcium carbonate, and wherein said composition contains glass fiber reinforcing agent in an amount within the range of 40 to 200 parts by weight per 100 parts by weight of (a) plus (b), 1 to 5 parts by weight of zinc stearate per 100 parts by weight of (a) plus (b), and 1 to 10 parts by weight of magnesium hydroxide per 100 parts by weight of (a) plus (b).

16. A composition according to claim 15 wherein said calcium carbonate is coated with a mixture of $C_{16}$ and $C_{18}$ fatty acids.

17. A composition according to claim 15 wherein said calcium carbonate is coated with calcium stearate.

18. A cured article produced by subjecting the composition of claim 15 to heat.

19. A cured article produced by subjecting the composition of claim 1 to heat.

20. A method of forming thermosetting compositions suitable for preparing reinforced plastic articles comprising mixing together under conditions of moderate shear
    (a) an unsaturated polyester prepared by reacting an unsaturated dicarboxylic acid and a polyol;
    (b) a rubber, said rubber being present in an amount so as to give a weight ratio of (a) to (b) within the range of 15:1 to 0.5:1;
    (c) a vinyl monomer, the total amount of vinyl monomer being within the range of 15 to 300 parts by weight of vinyl monomer per 100 parts by weight of said polyester plus said rubber;
    (d) a catalyst; and
    (e) 25 to 800 parts by weight per 100 parts by weight of (a) plus (b) of calcium carbonate at least 10 weight percent of which is coated with 0.1 to 5 weight percent of a fatty acid or fatty acid metal salt based on the weight of said calcium carbonate.

21. A method according to claim 20 wherein said fatty acid or fatty acid metal salt is coated onto the calcium carbonate by means of milling.

22. A method according to claim 20 wherein said fatty acid or fatty acid metal salt is present on said calcium carbonate in an amount within the range of 0.25 to 2 weight percent based on the weight of said calcium carbonate.

23. A method according to claim 22 wherein said shear produces a temperature rise of 2°-30° C.

24. A method according to claim 20 wherein the resulting composition is subjected to curing conditions of 100°-200° C. for a time within the range of 1 to 15 minutes.

25. A method according to claim 20 wherein said rubber is a normally solid carboxy-containing polymer of a conjugated diene having a weight average molecular weight within the range of 30,000 to 400,000.

* * * * *